Oct. 12, 1943.      H. L. HEXAMER      2,331,777
THERMIC TELLTALE
Filed Sept. 22, 1941
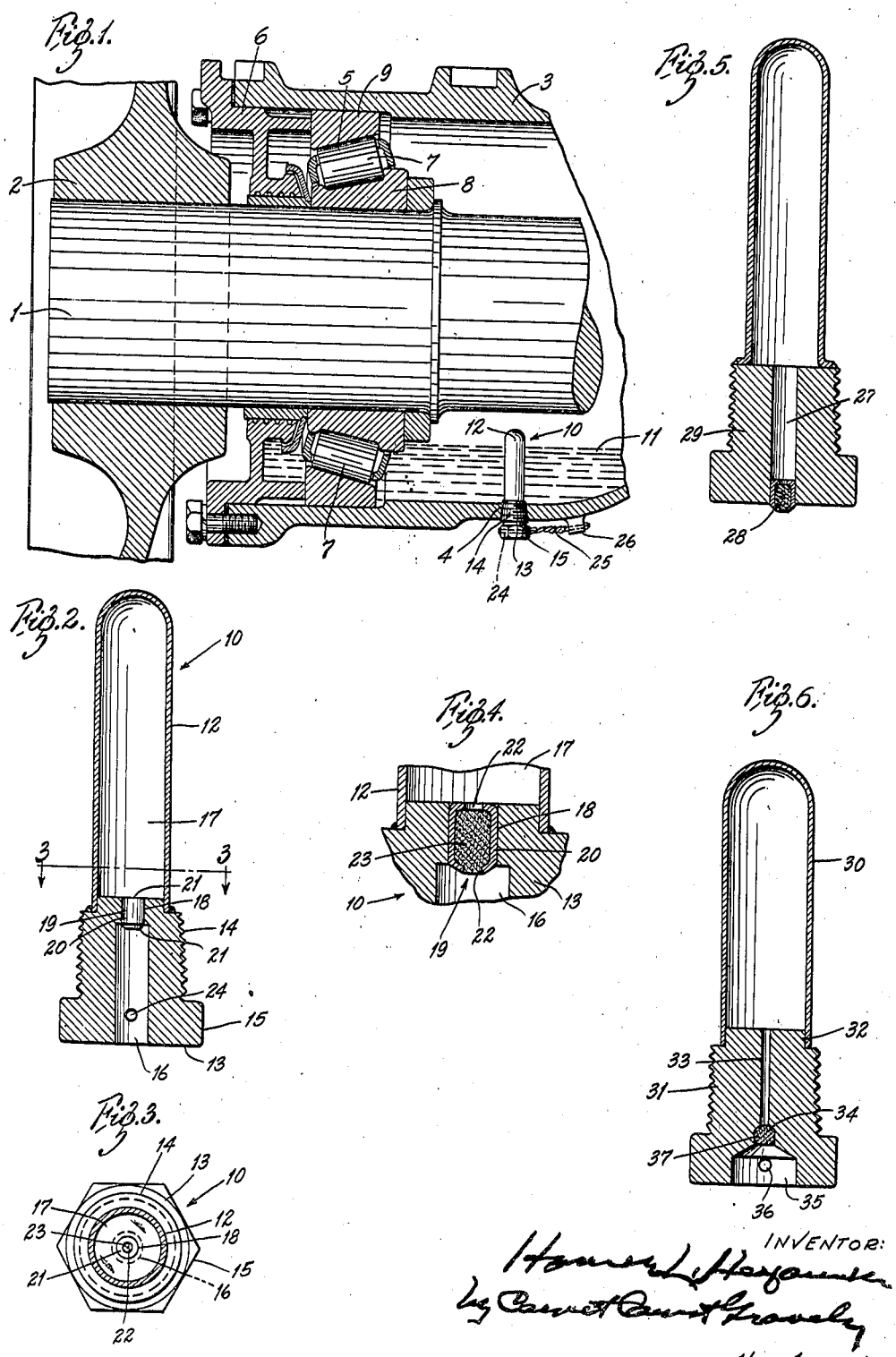

Patented Oct. 12, 1943

2,331,777

UNITED STATES PATENT OFFICE 2,331,777

THERMIC TELLTALE

Homer L. Hexamer, Canton, Ohio, assignor to The Timken Roller Bearing Company, Canton, Ohio, a corporation of Ohio Application September 22, 1941, Serial No. 411,795

6 Claims. (Cl. 116—114)

This application is a continuation in part of my copending application Serial No. 301,715, filed October 28, 1939, for patent for Thermic telltale, now Patent No. 2,280,755.

This invention relates to thermic telltales for indicating an overheated condition in various constructions. The invention has for its principal objects to provide a simple and efficient signaling device of inexpensive and compact construction which can be readily incorporated in various constructions, as for example, a bearing construction, and which is adapted to operate at a predetermined temperature to indicate to the sense of sight, smell, or both, an excessive temperature in the construction in which it is incorporated. The invention consists in the thermic telltale and in the construction, combinations, and arrangements hereinafter described and claimed.

In the accompanying drawing, which forms part of this specification and wherein like symbols refer to like parts wherever they occur, Fig. 1 is a vertical longitudinal section through the end portion of a roller bearing axle construction provided with a thermic telltale embodying my invention, Fig. 2 is an enlarged central longitudinal section through said telltale, Fig. 3 is a transverse section on line 3—3 in Fig. 2, Fig. 4 is a vertical longitudinal section through said telltale in the region of the fusible seal therefor;

Fig. 5 is an enlarged central longitudinal section through a modified form of telltale; and Fig. 6 is a central longitudinal sectional view of another modified form of telltale.

Referring to Fig. 1 of the accompanying drawing, my invention is shown in connection with a roller bearing axle construction; but it is also applicable to other antifriction bearing axle or shaft constructions and to various other constructions where it is desirable to protect the construction against excessive temperatures. The construction shown comprises an axle 1 having a wheel 2 fixed to one end thereof, a lubricant containing housing 3 surrounding the axle inwardly of said wheel and having a threaded drain opening 4 in its bottom, a roller bearing 5 interposed between the axle 1 and housing 3, and an end closure member 6 secured to the end of the housing for closing the annular space between the axle and housing. The roller bearing 5 comprises a series of conical rollers 7 interposed between a cone or inner raceway member 8 mounted on the axle 1 and a cup or outer raceway member 9 mounted in the bearing housing 3.

The above construction is provided with a thermic telltale 10 for indicating to the sense of smell, sight, or both, an overheated condition in the roller bearing. The telltale is preferably embodied in said construction by being threaded into the drain opening 4 of the housing 3 to thereby constitute a plug for said opening. As mounted, the telltale extends upwardly into the lubricant 11 in the bearing housing.

As illustrated in Figs. 2 and 3, the telltale 10 comprises a hollow tubular portion or cartridge 12 having a plug member 13 secured to its lower end in any suitable manner or if desirable integral therewith. On the upper portion of said plug member is an external thread 14 adapted to engage the threaded drain opening 4 in the bottom of the axle housing. The lower outer portion 15 of said plug member is flat-sided and adapted to receive a wrench.

A central passageway or bore 16 leads through said plug member into a chamber 17 in the hollow tubular portion 12 of the telltale device. The upper portion 18 of this narrow passageway or bore 16 adjacent to the chamber is of smaller diameter than the lower portion and forms a seat adapted to seat a seal 19. The chamber in the hollow tubular portion 12 of the telltale is adapted to contain an odoriferous or smoke producing liquid or both. The seal 19 is in position to close the narrow upper end portion 18 of passageway or bore 16 of the plug and thus cut off communication between the chamber 17 and the portion of said passageway located outwardly of said seal.

The seal comprises a cylindrical steel shell 20 with inturned end flanges 21 forming openings 22 at the ends of said shell. The steel shell contains a core 23 of fusible metal which closes the openings in the shell. This seal is pressfitted into the narrow upper portion 18 of the passageway 16 in the plug 13.

The plug member of the telltale is provided near its outer end with radial bores or passageways 24 adapted to receive a wire 25 which has one end anchored in a lug 26 provided therefor on the axle housing and has its other end twisted around the wire extending between said telltale device and said lug. This wire prevents the telltale device from working loose in the opening.

The operation of my device is as follows, the chamber 17 in the hollow tubular portion of the telltale device is filled with signaling material and the passageway or bore 16 through the plug member 13 is closed by the seal 19 with the fusible core 23. The device is positioned in the axle housing 3 and has its upper portion surrounded by the lubricant 11 in said housing. Heat is transmitted from the bearing 5 to the telltale device 10 through the lubricant and when the bearing temperature reaches a critical point due to defects or unusual conditions in the bearing assembly, the fusible core 23 of the seal melts and thus opens the passageway through the plug member, thereby establishing communication between the chamber containing the signaling fluid and the atmosphere. The escape of the signal fluid will constitute a warning which communicates to the sense of sight, smell, or both, thereby indicating that the bearing requires attention.

The modification shown in Fig. 5 is similar to the preferred embodiment of my invention described above, the main difference being in the passageway or bore through the plug member and in the position of the seal. The passageway or bore 27 has the same diameter throughout in the modification and the seal 28 is pressfitted into the lower end thereof. The modification shown in this figure does not have a radial bore 24 through the plug member 29. Such a bore through the passageway 27 would permit the escape of the signaling material. This telltale is positioned in the axle housing the same as the telltale described above and it is similar in operation.

The modified construction shown in Fig. 6 comprises a drawn sheet metal shell or elongated cup section 30 and an externally threaded pipe plug section 31 secured to the open end of said shell or cup. The open end of the elongated cup or shell 30 fits snugly around a reduced pilot portion 32 provided therefor on the adjacent end of the plug 31 and is brazed, welded or otherwise permanently secured thereto to provide a fluid tight joint.

The plug 31 has an axial bore or passageway 33 that extends therethrough from end to end thereof and opens into the interior of the elongated cup or shell 30. The axial bore 33 is enlarged or counterbored, as at 34, intermediate between the ends thereof and is further enlarged or counterbored, as at 35, at its outer end or mouth, both counterbores having tapered bottoms. The plug 31 has radial bores 36 leading from the counterbored or enlarged outer end 35 thereof adapted to receive the locking wire 26 hereinbefore referred to.

After the cup or shell 30 is filled through the axial bore 33 with a suitable warning material, the telltale is sealed by a sealing plug 37 of fusible metal that is preferably cast directly into the smaller counterbore or enlargement 34 of said bore and is preferably also soldered in place. The telltale shown in Fig. 6 is positioned in the axle housing or other construction in the manner hereinbefore described and operated to release the signaling fluid to the atmosphere when the heat is sufficient to melt the fusible seal 37.

The hereinbefore described telltale device has numerous advantages. It may be easily incorporated into many existing constructions without material alterations, it is practical and efficient and may be removed and refilled easily.

What I claim is:

1. A thermic telltale comprising a sheet metal cup section adapted to contain a signaling material, a plug section permanently united to the open end of said cup, said plug section having an axial bore extending therethrough from end to end thereof and opening into said cup, said bore having an enlarged portion intermediate between the ends thereof and a further enlarged portion at its outer end, and a fusible seal fitting within and closing said bore.

2. A thermic telltale comprising a sheet metal cup section adapted to contain a signaling material, a plug section permanently united to the open end of said cup, said plug section having an axial bore extending therethrough from end to end thereof and opening into said cup, and a fusible seal fitting within and closing said bore, said seal comprising a tube press fitted in said bore and a fusible core in said tube.

3. A thermic telltale comprising a sheet metal cup section adapted to contain a signaling material, a plug section permanently united to the open end of said cup, said plug section having an axial bore extending therethrough from end to end thereof and opening into said cup, said bore having an enlarged portion intermediate between the ends thereof and a further enlarged portion at its outer end, and a fusible seal fitting within said first mentioned enlargement and closing said bore.

4. A thermic telltale comprising an elongated sheet metal cup section adapted to contain a signaling material, an externally threaded plug section having a reduced pilot portion at one end thereof snugly fitting within the open end of said cup section and permanently united thereto to provide a leak-proof joint therebetween, said plug section having an axial bore extending therethrough from end to end thereof and opening into said cup, said bore having an enlarged portion intermediate between the end thereof and a further enlarged portion at its outer end, and a fusible seal fitting within said first mentioned enlargement and closing said bore.

5. A cartridge thermic telltale comprising an elongated cup section adapted to contain a signaling material, a plug section having one end disposed at the open end of said cup section and having a permanent leak-proof connection therewith, said plug section having a bore extending therethrough from end to end thereof and opening into said end of said cup section, and a fusible seal fitting within and closing said bore.

6. A cartridge thermic telltale comprising an elongated sheet metal cup section adapted to contain a signaling material, an exteriorly threaded plug section having one end disposed at the open end of said cup section and permanently united thereto to provide a leak-proof joint therebetween, said plug section having a bore extending therethrough from end to end thereof, said bore having a reduced inner end portion opening into said end of said cup section, and a fusible seal for said bore fitting within the reduced inner end portion thereof.

HOMER L. HEXAMER.

CERTIFICATE OF CORRECTION.

Patent No. 2,331,777.                                      October 12, 1943.

HOMER L. HEXAMER.

It is hereby certified that error appears in the printed specification of the above numbered patent requiring correction as follows: Page 2, second column, lines 48 and 57, after "cartridge" insert --type--; and that the said Letters Patent should be read with this correction therein that the same may conform to the record of the case in the Patent Office.

Signed and sealed this 18th day of January, A. D. 1944.

(Seal)
Henry Van Arsdale,
Acting Commissioner of Patents.